US012647942B2

(12) United States Patent
Zhang

(10) Patent No.: US 12,647,942 B2
(45) Date of Patent: Jun. 2, 2026

(54) METHOD AND DEVICE FOR DISCONTINUOUS RECEPTION

(71) Applicant: BUNKER HILL TECHNOLOGIES LLC, Allen, TX (US)

(72) Inventor: Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 970 days.

(21) Appl. No.: 17/851,045

(22) Filed: Jun. 28, 2022

(65) Prior Publication Data

US 2022/0330210 A1     Oct. 13, 2022

Related U.S. Application Data

(63) Continuation of application No. PCT/CN2020/140153, filed on Dec. 28, 2020.

(30) Foreign Application Priority Data

Jan. 10, 2020     (CN) .......................... 202010027655.3
Jan. 17, 2020     (CN) .......................... 202010053379.8

(51) Int. Cl.
*H04W 72/02*          (2009.01)
*H04W 68/00*          (2009.01)
                    (Continued)

(52) U.S. Cl.
CPC ....... *H04W 72/02* (2013.01); *H04W 72/0446* (2013.01); *H04W 72/0453* (2013.01); *H04W 68/005* (2013.01); *H04W 80/02* (2013.01)

(58) Field of Classification Search
None
See application file for complete search history.

(56) References Cited

U.S. PATENT DOCUMENTS

2015/0119088 A1*   4/2015   Lee ..................... H04W 68/005
                                                        455/458
2016/0119943 A1    4/2016   De Benedittis
                            (Continued)

FOREIGN PATENT DOCUMENTS

CN          104620515 A      5/2015
CN          108923896 A     11/2018
                    (Continued)

OTHER PUBLICATIONS

ISR received in application No. PCT/CN2020/140153 dated Mar. 3, 2021.

(Continued)

*Primary Examiner* — Jutai Kao
(74) *Attorney, Agent, or Firm* — Ascenda Law Group, PC

(57)          ABSTRACT

The present disclosure provides a method and a device used for discontinuous reception. A first node monitors a first signal in a first time resource pool, a first bit block is used to generate the first signal, the first bit block comprises a MAC PDU, and the first bit block comprises a first identification component; and a second receiver, when the first signal is successfully received in the first time resource pool, monitors a first signaling in a first time-frequency resource block; when the first signal is not successfully received in the first time resource pool, drops monitoring a first signaling in a first time-frequency resource block. The application can avoid the introduction of sidelink MAC CE to maintain the compatibility with the existing standards as far as possible; in addition, the application can reduce the overhead of air interface.

16 Claims, 5 Drawing Sheets

(51) Int. Cl.
| | |
|---|---|
| *H04W 72/0446* | (2023.01) |
| *H04W 72/0453* | (2023.01) |
| *H04W 80/02* | (2009.01) |

(56) References Cited

U.S. PATENT DOCUMENTS

| | | | | |
|---|---|---|---|---|
| 2021/0045026 A1* | 2/2021 | Lee | ....................... | H04W 76/27 |
| 2021/0274439 A1* | 9/2021 | Cui | ..................... | H04W 68/005 |
| 2022/0167306 A1* | 5/2022 | Wu | ......................... | H04W 4/20 |
| 2022/0225339 A1* | 7/2022 | Lee | ......................... | H04W 4/06 |
| 2022/0322283 A1* | 10/2022 | Ji | ......................... | H04W 68/02 |

FOREIGN PATENT DOCUMENTS

| | | |
|---|---|---|
| CN | 109699074 A | 4/2019 |
| CN | 110149183 A | 8/2019 |
| WO | 2017138378 A1 | 8/2017 |

OTHER PUBLICATIONS

First Search Report of Chinses patent application No. CN202010053379.8 dated Mar. 21, 2022.
Notification to Grant Patent Right for Invention of Chinses patent application No. CN202010053379.8 dated Mar. 29, 2022.
LG Electronics Discussion on sidelink resource allocation and configuration for FeD2D 3GPP TSG RAN WG1 Meeting #90 R1-1713116 Aug. 12, 2017.

* cited by examiner

100

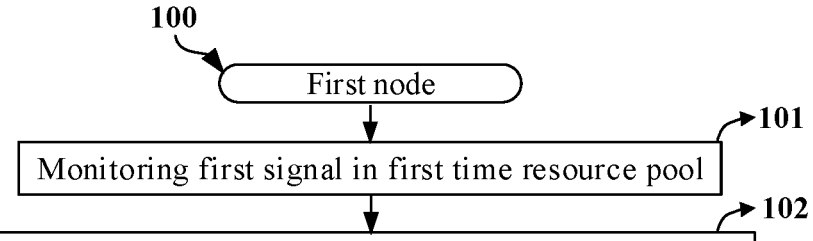

First node

101

Monitoring first signal in first time resource pool

102

When the first signal is successfully received in the first time resource pool, monitoring first signaling on first time-frequency resource block; and when the first signal is not successfully received in the first time resource pool, dropping monitoring first signaling on first time-frequency resource block

FIG.1

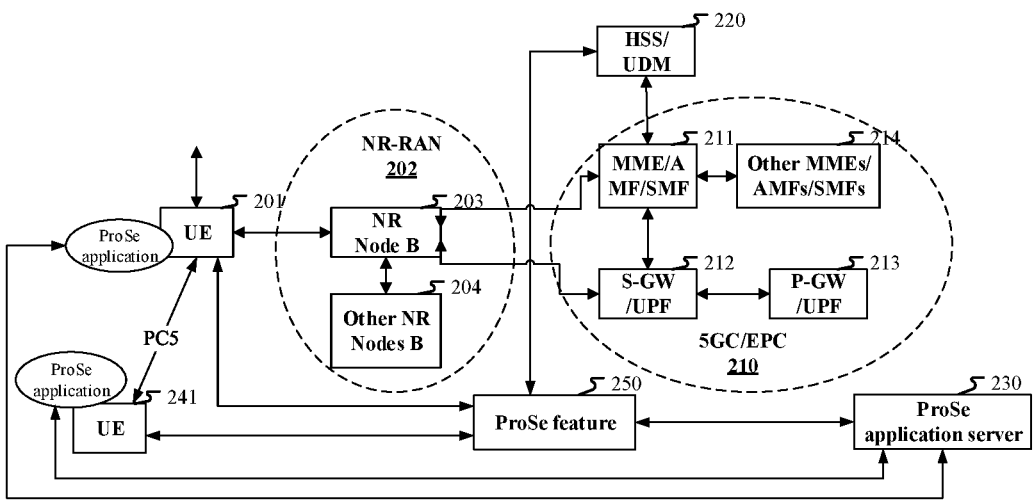

FIG. 2

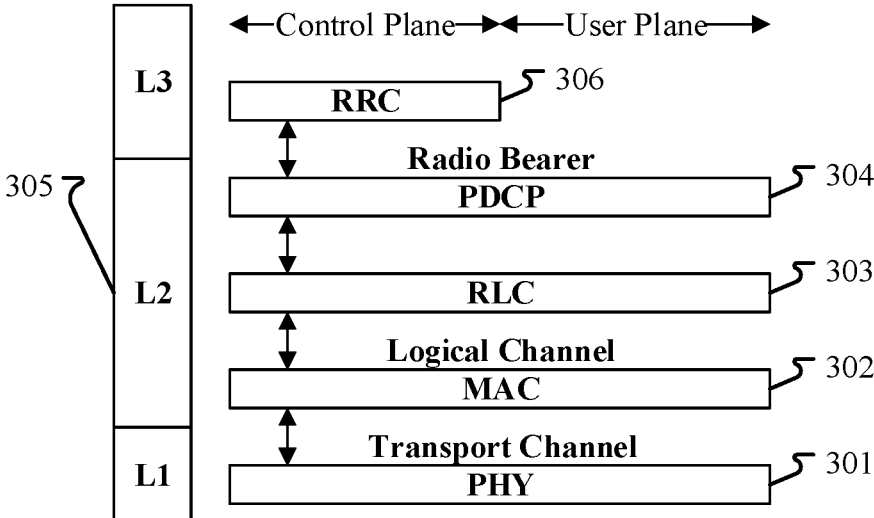

FIG. 3

METHOD AND DEVICE FOR DISCONTINUOUS RECEPTION

CROSS REFERENCE TO RELATED APPLICATIONS

This application is the continuation of International patent application PCT/CN2020/140153, filed on Dec. 28, 2020, which claims the priority benefit of Chinese Patent Application No. 202010053379.8, filed on Jan. 17, 2020, and the priority benefit of Chinese Patent Application No. 202010027655.3, filed on Jan. 10, 2020 the full disclosure of which is incorporated herein by reference.

BACKGROUND

Technical Field

The present disclosure relates to methods and devices in wireless communication systems, and in particular to a scheme and a device supporting discontinuous reception in a wireless communication system.

Related Art

Discontinuous Reception (DRX) is a method commonly used in cellular communications to reduce power consumption of communication terminals and lengthen standby time. A base station controls a DRX-related timer through Downlink Control Information (DCI) or a Medium Access Control (MAC) Control Element (CE), so as to control whether a terminal performs a wireless reception in a given subframe.

As a significant application scenario of cellular communications, Vehicle to everything (V2X) enables direct communications between two communication terminals.

At 3rd Generation Partner Project (3GPP) Radio Access Network (RAN) #86 Plenary, a research project of V2X DRX was officially approved.

SUMMARY

Inventors found through researches that in V2X, Sidelink Control Information (SCI) can only carry a part of a receiver identifier (ID) of a complete MAC layer, that is, a User Equipment (UE) cannot determine whether data transmitted on a Physical Sidelink Shared CHannel (PSSCH) is useful data after receiving the SCI. Therefore, the UE may not be able to accurately adjust a DRX-related timer according to the SCI.

To address the above problem, the present disclosure provides a solution. It should be noted that though the present disclosure only took the V2X scenario for example or as a typical scenario in the statement above, it is also applicable to other scenarios confronting the same difficulty, including downlink transmission, where similar technical effects can be achieved. Additionally, the adoption of a unified solution for various scenarios, including but not limited to V2X, downlink communication, contributes to the reduction of hardcore complexity and costs. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:

monitoring a first signal in a first time resource pool, a first bit block being used to generate the first signal, the first bit block comprising a MAC Protocol Data Unit (PDU), the first bit block comprising a first identification component; and when the first signal is successfully received in the first time resource pool, monitoring a first signaling on a first time-frequency resource block; and when the first signal is not successfully received in the first time resource pool, dropping monitoring a first signaling on a first time-frequency resource block;

herein, the first signaling is a physical layer signaling, and the first signaling comprises a second identification component; both the first identification component and the second identification component belong to a first link layer ID.

In one embodiment, the first node is a UE.

In one embodiment, the first node is a relay node.

In one embodiment, the first bit block is transmitted on a SideLink Share CHannel (SL-SCH).

In one subembodiment of the above embodiment, the above embodiment can use a MAC Service Data Unit (SDU) to control a DRX state, which avoids the introduction of a sidelink MAC CE and maintains the compatibility with the existing standards as far as possible.

In one embodiment, the first node judges whether a first signal is a useful signal, so as to accurately judge whether a wireless reception is executed on the first time-frequency resource block.

In one embodiment, the above method enables that a scheduling signaling of a first signal do not need to carry the first link layer ID, thus reducing the radio overhead.

Specifically, according to one aspect of the present disclosure, the method in a first node for wireless communications comprises:

determining a first link layer ID list, the first link layer ID being any link layer ID in the first link layer ID list.

Specifically, according to one aspect of the present disclosure, the method in a first node for wireless communications comprises:

receiving at least one target signaling in the first time resource pool;

herein, each of the at least one target signaling is a physical layer signaling, and each of the at least one target signaling comprises the second identification component; and when the first signal is monitored in the first time resource pool, the first signal is scheduled by one of the at least one target signaling.

In one embodiment, any target signaling received by the first node in the first time resource pool schedules a physical layer channel, and the first node monitors the first signal in all physical layer channels scheduled by received target signalings.

In one embodiment, the any target signaling is SCI, and the first physical layer channel is a PSSCH.

Specifically, according to one aspect of the present disclosure, the method in a first node for wireless communications comprises:

transmitting a second signaling; the second signaling indicating a first parameter set; and the first parameter set indicating the first time resource pool.

In one embodiment, the first node is a UE, and the above method ensures that the opposite UE of the first node can infer a DRX state of the first node.

Specifically, according to one aspect of the present disclosure, the method in a first node for wireless communications comprises:

when the first signal is not successfully received in the first time resource pool, keeping counting of a first timer; and when the first signal is successfully received in the first time resource pool, restarting a first timer;

In one embodiment, the first bit block comprises a MAC SDU and a corresponding MAC head, and the corresponding MAC head comprises the first identification component.

In one embodiment, the above method enables the first node to determine whether a first bit block is useful data according to a MAC head corresponding to a MAC SDU, so as to determine how to adjust the first timer; the above method makes minor changes to the standard to maintain the compatibility as far as possible.

In one embodiment, the above method avoids introducing a MAC CE into sidelink, which reduces the implementation complexity and simplifies the design.

In one embodiment, the corresponding MAC head is a MAC PDU head in the MAC PDU in a first bit block.

In one embodiment, the first bit block is transmitted on an SL-SCH, and the corresponding MAC head is an SL-SCH subheader in the MAC PDU in a first bit block.

In one embodiment, the first bit block is transmitted on an SL-SCH, and the corresponding MAC head is a DST field in the MAC PDU in a first bit block.

Specifically, according to one aspect of the present disclosure, the method in a first node for wireless communications comprises:

when the first signal is not successfully received in the first time resource pool, maintaining a halted state of a first timer; and when the first signal is successfully received in the first time resource pool, starting a first timer.

In one embodiment, the above method enables the first node to determine whether a first bit block is useful data according to a MAC head corresponding to a MAC SDU, so as to determine how to adjust the first timer; the above method makes minor changes to the standard to maintain the compatibility as far as possible.

In one embodiment, the above method avoids introducing a MAC CE into sidelink, which reduces the implementation complexity and simplifies the design.

Specifically, according to one aspect of the present disclosure, when a radio signal scheduled by any of the at least one target signaling is not correctly decoded, the third timer is started; and when radio signals scheduled by all target signals in the at least one target signaling are all correctly decoded, a halted state of a third timer is maintained;

wherein the third timer is in a halted state in a slot to which the first time-frequency resource block belongs.

In one embodiment, for any of the at least one target signaling, an associated HARQ-ACK is transmitted to indicate whether a corresponding scheduled radio signal is correctly decoded.

The present disclosure provides a method in a second node for wireless communications, comprising:

transmitting a first signal, a first bit block being used to generate the first signal, the first bit block comprising a MAC PDU, and the first bit block comprising a first identification component; and selecting an appropriate time-frequency resource block out of a candidate time-frequency resource pool, and transmitting a first signaling in the appropriate time-frequency resource block;

herein, the first signaling is a physical layer signaling, and the first signaling comprises a second identification component; both the first identification component and the second identification component belong to a first link layer ID; when the first signal is transmitted in the first time resource pool, the candidate time-frequency resource pool comprises a first time-frequency resource block; and when the first signal is not transmitted in the first time resource pool, the candidate time-frequency resource pool does not comprise a first time-frequency resource block.

In one embodiment, the above method can ensure that the second node avoids a non-receiving slot of a first node to transmit a first signaling, thus ensuring a reception of the first signaling.

In one embodiment, a number of Resource Elements (REs) comprised in the candidate time-frequency resource pool is greater than a number of REs comprised in the appropriate time-frequency resource block.

In one embodiment, the candidate time-frequency resource pool, the first time-frequency resource block and the appropriate time-frequency resource block respectively comprise a plurality of REs.

In one embodiment, the candidate time-frequency resource pool comprises a plurality of time-frequency resource blocks, each of the plurality of time-frequency resource blocks is consecutive in time domain, the appropriate time-frequency resource block is one of the plurality of time-frequency resource blocks, and at least two of the plurality of time-frequency resource blocks are non-consecutive in time.

In one embodiment, the appropriate time-frequency resource block and the first time-frequency resource block are two different time-frequency resource blocks among the plurality of time-frequency resource blocks.

In one embodiment, the appropriate time-frequency resource block and the first time-frequency resource block are completely overlapping.

In one embodiment, the appropriate time-frequency resource block and the first time-frequency resource block are partially overlapping.

In one embodiment, how to select the appropriate time-frequency resource block is implementation-associated.

In one embodiment, the appropriate time-frequency resource block is randomly selected out of the candidate time-frequency resource pool.

In one embodiment, the candidate time-frequency resource pool is determined by the second node itself.

In one embodiment, the candidate time-frequency resource pool is configured by a downlink signaling.

In one embodiment, the candidate time-frequency resource pool is a V2X resource pool.

In one embodiment, the appropriate time-frequency resource block is selected according to the method in Long Term Evolution (LTE) standard TS36.213, a useful time-frequency resource block set is selected according to measured channel quality and priority in SCI, and then the appropriate time-frequency resource block is selected out of the useful time-frequency resource block set by a higher layer.

Specifically, according to an aspect of the present disclosure, the method in a second node for wireless communications comprises:

determining a second link layer ID list, the first link layer ID is a link layer ID in the second link layer ID list.

In one embodiment, the second node receives an application layer signaling to determine a second link layer ID list.

In one embodiment, the second node receives an RRC layer signaling to determine a second link layer ID list.

In one embodiment, the second node receives a MAC layer signaling to determine a second link layer ID list.

In one embodiment, the second node determines a second link layer ID list by itself in MAC layer.

In one embodiment, the application layer signaling is generated by the second node itself.

In one embodiment, the application layer signaling is transmitted by a first node to the second node.

In one embodiment, the MAC layer signaling is transmitted by a first node to the second node.

In one embodiment, the application layer signaling is transmitted by a network side device to the second node.

In one embodiment, the application layer signaling is transmitted by an application server to the second node.

Specifically, according to an aspect of the present disclosure, the method in a second node for wireless communications comprises:

transmitting at least one target signaling in the first time resource pool;

herein, each of the at least one target signaling is a physical layer signaling, and each of the at least one target signaling comprises the second identification component; and the first signal is scheduled by one of the at least one target signaling.

Specifically, according to an aspect of the present disclosure, the method in a second node for wireless communications comprises:

receiving a second signaling; the second signaling indicating a first parameter set; and the first parameter set indicating the first time resource pool.

Specifically, according to an aspect of the present disclosure, the method in a second node for wireless communications comprises:

when time-domain resources occupied by the first signal are not present in the first time resource pool, keeping counting of a first reference timer; and when time-domain resources occupied by the first signal are present in the first time resource pool, restarting a first reference timer.

Specifically, according to an aspect of the present disclosure, the method in a second node for wireless communications comprises: when time-domain resources occupied by the first signal are not present in the first time resource pool, maintaining a halted state of a first reference timer; and when time-domain resources occupied by the first signal are present in the first time resource pool, starting a first reference timer.

Specifically, according to an aspect of the present disclosure, the method in a second node for wireless communications comprises: when an ACK associated with any of the at least one target signaling is not received, starting a third reference timer; and when ACK(s) associated with each of the at least one target signaling is(are) received, maintaining a halted state of a third reference timer.

herein, the third reference timer is in a halted state in a slot to which the first time-frequency resource block belongs.

The present disclosure provides a first node for wireless communications, comprising:

a first receiver, monitoring a first signal in a first time resource pool, a first bit block being used to generate the first signal, the first bit block comprising a MAC PDU, and the first bit block comprising a first identification component; and a second receiver, when the first signal is successfully received in the first time resource pool, monitoring a first signaling on a first time-frequency resource block;

and when the first signal is not successfully received in the first time resource pool, dropping monitoring a first signaling on a first time-frequency resource block;

herein, the first signaling is a physical layer signaling, and the first signaling comprises a second identification component; both the first identification component and the second identification component belong to a first link layer ID.

The present disclosure provides a second node for wireless communications, comprising:

a second transmitter, transmitting a first signal, a first bit block being used to generate the first signal, the first bit block comprising a MAC PDU, and the first bit block comprising a first identification component; and a third transmitter, when the first signal is transmitted in the first time resource pool, transmitting a first signaling on a first time-frequency resource block; and when the first signal is not transmitted in the first time resource pool, dropping transmitting a first signaling on a first time-frequency resource block;

herein, the first signaling is a physical layer signaling, and the first signaling comprises a second identification component; both the first identification component and the second identification component belong to a first link layer ID.

BRIEF DESCRIPTION OF THE DRAWINGS

Other features, objects and advantages of the present disclosure will become more apparent from the detailed description of non-restrictive embodiments taken in conjunction with the following drawings:

FIG. 1 illustrates a flowchart of determining whether a first signaling is monitored according to a first signal according to one embodiment of the present disclosure;

FIG. 2 illustrates a schematic diagram of a network architecture according to one embodiment of the present disclosure;

FIG. 3 illustrates a schematic diagram of a radio protocol architecture of a user plane and a control plane according to one embodiment of the present disclosure;

DESCRIPTION OF THE EMBODIMENTS

Figure 4:
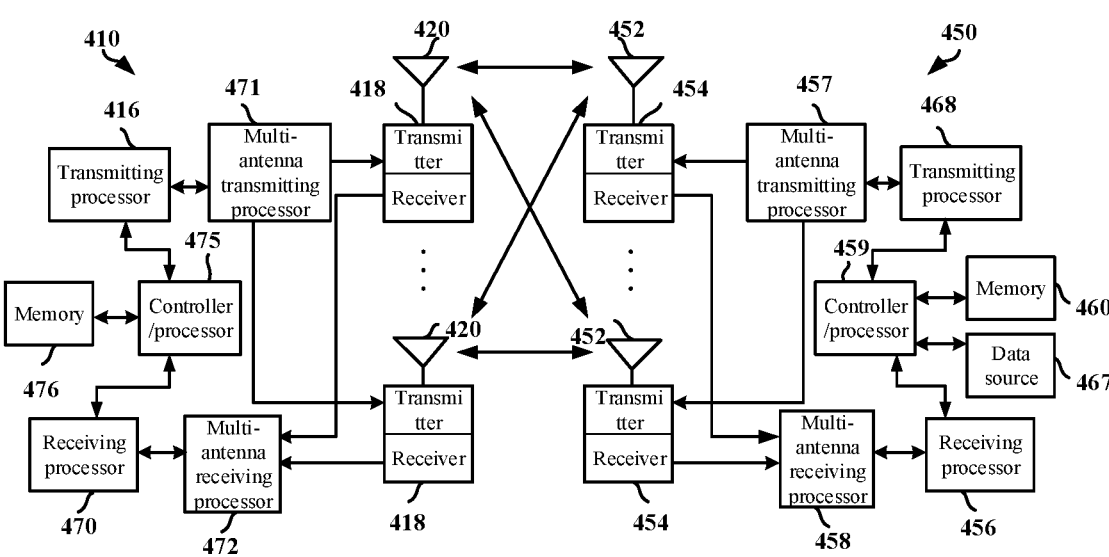
FIG. 4 illustrates a schematic diagram of hardware modules of a communication node according to one embodiment of the present disclosure.

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Embodiment 1 illustrates a flowchart of determining whether a first signaling is monitored according to a first signal according to one embodiment of the present disclosure, as shown in FIG. 1.

In embodiment 1, a first node 100 monitors a first signal in a first time resource pool in step 101, a first bit block is used to generate the first signal, the first bit block comprises a MAC PDU, and the first bit block comprises a first identification component; and in step S102, when the first signal is successfully received in the first time resource pool, monitors a first signaling on a first time-frequency resource block, and when the first signal is not successfully received in the first time resource pool, drops monitoring a first signaling on a first time-frequency resource block;

In embodiment 1, the first signaling is a physical layer signaling, and the first signaling comprises a second identification component; both the first identification component and the second identification component belong to a first link layer ID.

In one embodiment, a format of the first signaling is SCI format 0-2.

In one embodiment, a format of the first signaling is SCI format 0.

In one embodiment, time-frequency resources occupied by the first signaling are indicated by 1st stage SCI; and a HARQ process number of the first signal and a New Data Indicator (NDI) are indicated by 2nd stage SCI.

In one embodiment, the first signal is obtained after the first bit block sequentially goes through channel coding, scrambling, modulation, layer mapping, precoding, resource mapping and generation of multicarrier symbols.

In one embodiment, the first signal is obtained after the first bit block sequentially goes through CRC Insertion, channel coding, scrambling, modulation, resource mapping and generation of multicarrier symbols.

In one embodiment, the first signal is obtained after the first bit block goes through scrambling, CRC coding, channel coding, rescrambling, modulation, resource mapping and generation of multicarrier symbols.

In one embodiment, the phrase of monitoring a first signal comprises: performing channel decoding in scheduled time-frequency resources, and judging whether the channel decoding is correct according to a CRC.

In one subembodiment of the above embodiment, if a CRC check is not passed, the monitoring does not successfully receive a first signal; and if a CRC is passed, information bits acquired after channel decoding are transmitted to a higher layer, and the higher layer judges whether the first signal is received successfully.

In one subembodiment of the above embodiment, if a CRC check is not passed, the monitoring does not successfully receive a first signal; and if a CRC check is passed, the monitoring successfully receives a first signal.

In one embodiment, the scheduled time-frequency resources comprise a plurality of Resource Elements (REs).

In one embodiment, the first bit block is transmitted on a SideLink Shared CHannel (SL-SCH), and the scheduled time-frequency resources are scheduled by SCI.

In one embodiment, the first bit block is transmitted on a DownLink Shared CHannel (DL-SCH), and the scheduled time-frequency resources are scheduled by DCI.

In one embodiment, the phrase of monitoring a first signal comprises: decoding an information bit block transferred from a physical layer at a MAC layer, and determining whether a first signal is correctly received according to meaning of the information bit block.

In one embodiment, when the first identification component is comprised in the information bit block, it is judged that the first signal is successfully received.

In one embodiment, when the information bit block is successfully decoded by a MAC entity and when the information bit block comprises the first identification component, it is judged that the first signal is successfully received.

In one embodiment, when the information bit block is successfully decoded by a MAC entity and when the first identification component is comprised in the information bit block, it is judged that the first signal is successfully received.

In one embodiment, when it is judged that the first signal is successfully received, the information bit block is the first bit block.

In one embodiment, the phrase of monitoring a first signaling comprises: executing a blind decoding.

In one embodiment, the phrase of monitoring a first signaling comprises: executing an energy detection.

In one embodiment, the phrase of monitoring a first signaling comprises: executing a CRC verification.

In one embodiment, the phrase of monitoring a first signaling comprises: respectively executing blind decoding on each RE set in a plurality of REs, for each blind decoding, it is judged whether decoding is correct according to a CRC, and if correctly decoded and a first bit field in a decoded SCI is equal to the second identification component, the first signaling is received and the first signaling is the decoded SCI; if wrongly decoded and a first bit field in a decoded SCI is not equal to the second identification component, the first signaling is not received.

In one subembodiment of the above embodiment, the plurality of RE sets are respectively reserved for a Physical Sidelink Control Channel (PSCCH).

In one subembodiment of the above embodiment, the first field comprises a destination ID field.

In one subembodiment of the above embodiment, the first field comprises a source ID field.

In one subembodiment of the above embodiment, the first field comprises a group destination ID field.

In one embodiment, the phrase of monitoring a first signaling comprises: respectively executing blind decoding on each RE set in a plurality of REs, for each blind decoding, it is judged whether decoding is correct according to a CRC, and if correctly decoded and a first bit field in a decoded DCI is equal to the second identification component, the first signaling is received and the first signaling is the decoded DCI; if wrongly decoded and a first bit field in a decoded DCI is not equal to the second identification component, the first signaling is not received.

In one subembodiment of the above embodiment, the plurality of RE sets are respectively reserved for a Physical Downlink Control Channel (PDCCH).

In one embodiment, the first link layer ID consists of X bit(s), the second identification component consists of Y1 bit(s), and the first identification component consists of Y2 bit(s), X, Y1 and Y2 being respectively positive integers.

In one embodiment, a sum of Y1 plus Y2 is equal to X.

In one embodiment, a sum of Y1 plus Y2 is less than X.

In one embodiment, the X bits consist of the Y1 bit(s) and the Y2 bit(s).

In one embodiment, the Y1 bit(s) and the Y2 bit(s) are respectively Y1 Least Significant Bit(s) and Y2 Most Significant Bit(s) among the X bits.

In one embodiment, X, Y1 and Y2 are multiples of 8 respectively.

In one embodiment, X, Y1 and Y2 are 24, 16 and 8 respectively.

In one embodiment, X, Y1 and Y2 are 24, 8 and 16 respectively.

In one embodiment, X, Y1 and Y2 are 32, 8 and 16 respectively.

In one embodiment, X, Y1 and Y2 are 32, 8 and 24 respectively.

In one embodiment, the first signaling comprises SCI.

In one embodiment, the first signaling comprises DCI.

In one embodiment, the first time-frequency resource block comprises a plurality of Resource Elements (REs).

In one embodiment, the first time-frequency resource block belongs to a carrier in frequency domain.

In one embodiment, the first time-frequency resource block comprises at least one multi-carrier symbol in time domain.

In one embodiment, the first time-frequency resource block is reserved for a physical layer control signaling.

In one embodiment, the first time-frequency resource block is reserved for SCI.

In one embodiment, the multicarrier symbol is an Orthogonal Frequency Division Multiplexing (OFDM) symbol.

In one embodiment, the multicarrier symbol is a Single-Carrier Frequency-Division Multiple Access (SC-FDMA) symbol.

In one embodiment, the multi-carrier symbol is a Filter Bank Multicarrier (FBMC) symbol.

In one embodiment, the first link layer identity is a Prose UE ID.

In one embodiment, the first link layer ID is a destination-layer-2 ID.

In one embodiment, the first node 100 determines a first link layer ID list, and the first link layer ID is any link layer ID in the first link layer ID list.

In one embodiment, the first receiver receives an application layer signaling to determine a first link layer ID list.

In one embodiment, the first receiver receives a Radio Resource Control (RRC) layer signaling to determine a first link layer ID list.

In one embodiment, the first receiver determines at least one link layer ID in the first link layer ID list at MAC layer by itself.

In one embodiment, the application layer signaling is generated by the first node itself.

In one embodiment, the application layer signaling is transmitted by a network side device to the first node.

In one embodiment, the application layer signaling is transmitted by an application server to the first node.

In one embodiment, the first link layer ID list is completely indicated by the application layer signaling.

In one embodiment, the application layer signaling indicates Q link layer IDs, each ID of the Q link layer IDs corresponds to a physical layer ID, Q being a positive integer greater than 1; the first link layer ID list consists of those monitored link layer IDs of corresponding physical layer IDs in the Q link layer IDs in a physical layer control channel of the first time resource pool.

In one embodiment, the physical layer control channel is a Physical Sidelink Control CHannel (PSCCH).

In one embodiment, the physical layer control channel is a Physical Downlink Control CHannel (PDCCH).

In one embodiment, the first link layer ID list only comprises the first link layer ID.

In one embodiment, the first link layer ID list comprises a plurality of link layer IDs, and the first link layer ID is one of the plurality of link layer IDs.

Embodiment 2

Embodiment 2 illustrates a schematic diagram of a network architecture according to one embodiment of the present disclosure, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS). The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 and the UE 241 are connected via a PC5 reference point.

In one embodiment, the ProSe function 250 is connected with the UE 201 and the UE 241 respectively via a PC3 reference point.

In one embodiment, the ProSe function 250 is connected with the ProSe application server 230 via a PC2 reference point.

In one embodiment, the ProSe application server 230 is connected with the ProSe application of the UE 201 and the ProSe application of the UE 241 respectively via a PC1 reference point.

In one embodiment, the first node in the present disclosure is the UE 201.

In one embodiment, the second node in the present disclosure is the UE 201.

In one embodiment, the first node in the present disclosure is the UE 241.

In one embodiment, the second node in the present disclosure is the UE 241.

In one embodiment, the first node and the second node in the present disclosure are respectively the UE 201 and the UE 241.

In one embodiment, a wireless link between the UE 201 and the UE 241 corresponds to a sidelink (SL) in the present disclosure.

In one embodiment, a wireless link between the UE 201 and NR node B is an uplink.

In one embodiment, a wireless link between NR node B and UE 201 is a downlink.

In one embodiment, the UE 201 supports DRX transmission.

In one embodiment, the UE 241 supports DRX transmission.

In one embodiment, the gNB 203 is a MarcoCellular base station.

In one embodiment, the gNB 203 is a Micro Cell base station.

In one embodiment, the gNB 203 is a PicoCell base station.

In one embodiment, the gNB 203 is a Femtocell.

In one embodiment, the gNB 203 is a base station supporting large delay differences.

In one embodiment, the gNB 203 is a flight platform.

In one embodiment, the gNB 203 is satellite equipment.

Embodiment 3

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 or physical layer in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the L2 layer 305 belongs to a higher layer.

In one embodiment, an RRC sublayer in the L3 layer belongs to a higher layer.

Embodiment 4

Embodiment 4 illustrates a schematic diagram of hardware modules of a communication node according to one embodiment of the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second node 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least: monitors a first signal in a first time resource pool, a first bit block is used to generate the first signal, the first bit block comprises a MAC PDU, and the first bit block comprises a first identification component; when the first signal is successfully received in the first time resource pool, monitors a first signaling on a first time-frequency resource block; when the first signal is not successfully received in the first time resource pool, drops monitoring a first signaling on a first time-frequency resource block; herein, the first signaling is a physical layer signaling, and the first signaling comprises a second identification component; both the first identification component and the second identification component belong to a first link layer ID.

In one embodiment, the first communication device 450 comprises at least one processor and at least one memory. a memory that stores a computer readable instruction program. The computer readable instruction program generates an action when executed by at least one processor. The action includes: monitoring a first signal in a first time resource pool, a first bit block being used to generate the first signal, the first bit block comprising a MAC PDU, and the first bit block comprising a first identification component; and when the first signal is successfully received in the first time resource pool, monitoring a first signaling on a first time-frequency resource block; and when the first signal is not successfully received in the first time resource pool, dropping monitoring a first signaling on a first time-frequency resource block; herein, the first signaling is a physical layer signaling, and the first signaling comprises a second identification component; both the first identification component and the second identification component belong to a first link layer ID.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first signal, a first bit block is used to generate the first signal, the first bit block comprises a MAC PDU, and the first bit block comprises a first identification component; selects an appropriate time-frequency resource block out of a candidate time-frequency resource pool, and transmits a first signaling in the appropriate time-frequency resource block; herein, the first signaling is a physical layer signaling, and the first signaling comprises a second identification component; both the first identification component and the second identification component belong to a first link layer ID; when the first signal is transmitted in the first time resource pool, the candidate time-frequency resource pool comprises a first time-frequency resource block; and when the first signal is not transmitted in the first time resource pool, the candidate time-frequency resource pool does not comprise a first time-frequency resource block.

In one embodiment, the second communication device 410 comprises a memory that stores a computer readable instruction program. The computer readable instruction program generates an action when executed by at least one processor. The action includes: transmitting a first signal, a first bit block being used to generate the first signal, the first bit block comprising a MAC PDU, and the first bit block comprising a first identification component; and selecting an appropriate time-frequency resource block out of a candidate time-frequency resource pool, and transmitting a first signaling in the appropriate time-frequency resource block; herein, the first signaling is a physical layer signaling, and the first signaling comprises a second identification component; both the first identification component and the second identification component belong to a first link layer ID; when the first signal is transmitted in the first time resource pool, the candidate time-frequency resource pool comprises a first time-frequency resource block; and when the first signal is not transmitted in the first time resource pool, the candidate time-frequency resource pool does not comprise a first time-frequency resource block.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the second communication device 410 is a UE.

In one embodiment, the antenna 452, the receiver 454, the multi-antenna receiving processor 458, the receiving processor 456 and the controller/processor 459 are used to monitor a first signal and a first signaling; the antenna 420, the transmitter 418, the multi-antenna transmitting processor 471, the transmitting processor 416 and the controller/processor 475 are used to transmit a first signal and a first signaling.

Embodiment 5

Figure 5:
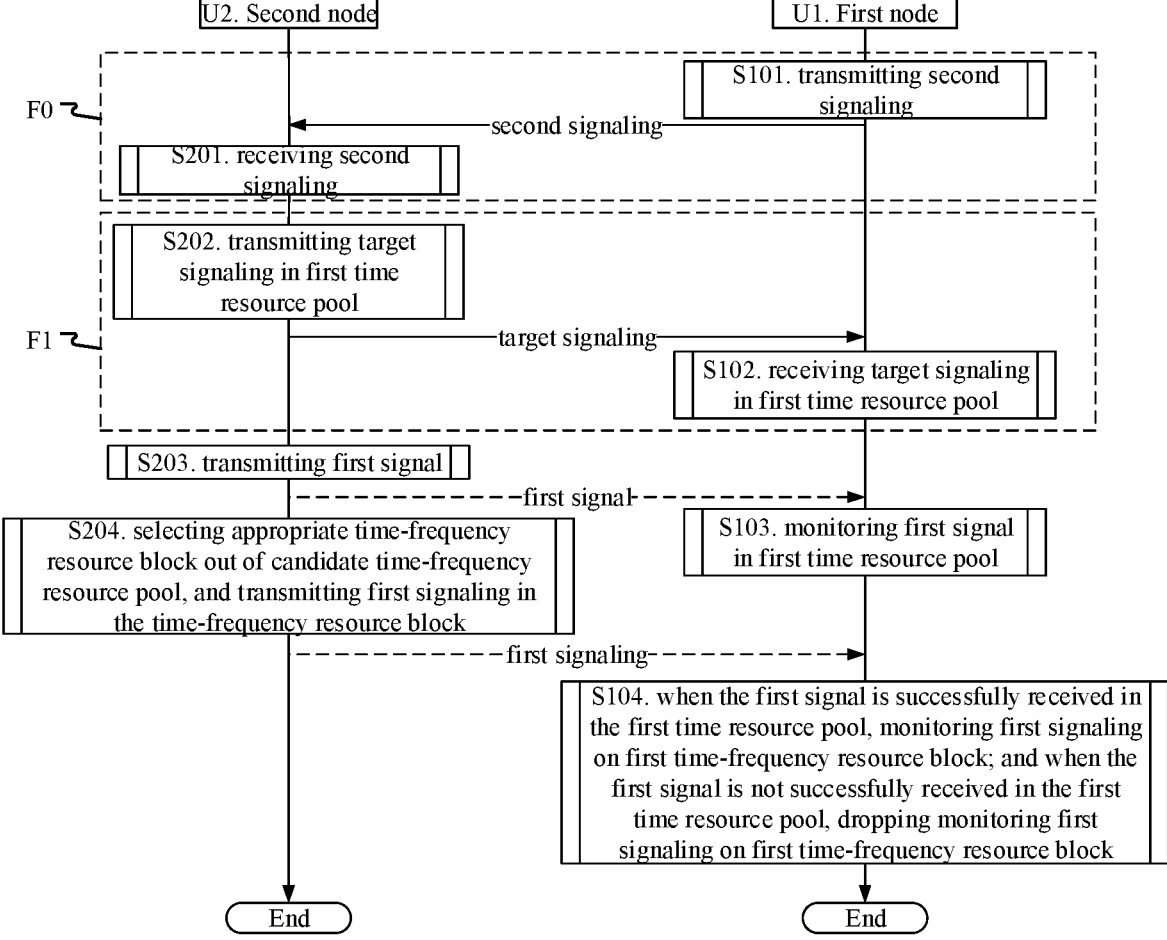
FIG. 5 illustrates a flowchart of transmission between a first node and a second node according to one embodiment of the present disclosure.

Embodiment 5 illustrates a flowchart of transmission between a first node and a second node according to one embodiment of the present disclosure, as shown in FIG. 5. In FIG. 5, steps in boxes F0 and F1 are respectively optional.

The first node U1 transmits a second signaling in step S101; receives a target signaling in a first time resource pool in step S102; monitors a first signal in a first time resource pool in step S103, a first bit block is used to generate the first signal, the first bit block comprises a MAC PDU, and the first bit block comprises a first identification component; and in step S104, when the first signal is successfully received in the first time resource pool, monitors a first signaling on a first time-frequency resource block; when the first signal is not successfully received in the first time resource pool, drops monitoring a first signaling on a first time-frequency resource block;

the second node U2 receives a second signaling in step S201; transmits a target signaling in a first time resource pool in step S202; transmits the first signal in step S203; in step S204, selects an appropriate time-frequency resource block out of a candidate time-frequency resource pool, and transmits a first signaling in the appropriate time-frequency resource block;

in embodiment 5, the first signaling is a physical layer signaling, and the first signaling comprises a second identification component; both the first identification component and the second identification component belong to a first link layer ID; the second signaling indicates a first parameter set; and the first parameter set indicates the first time resource pool; the target signaling is a physical layer signaling, and the target signaling comprises the second identification component; when the first signal is monitored in the first time resource pool, the first signal is scheduled by the target signaling; when the first signal is transmitted in the first time resource pool, the candidate time-frequency resource pool comprises a first time-frequency resource block; and when the first signal is not transmitted in the first time resource pool, the candidate time-frequency resource pool does not comprise a first time-frequency resource block.

In one embodiment, the first node U1 receives a plurality of target signalings in the first time resource pool, and any of the plurality of target signalings comprises the second identification component; the target signaling in step S201 is one of the plurality of target signalings.

In one embodiment, when a radio signal scheduled by any of the plurality of target signalings is not correctly decoded, the first receiver starts a third timer; when radio signal(s) scheduled by each of the at least one target signaling is(are) correctly decoded, the first receiver maintains a halted state of a third timer;

herein, the third timer is in a halted state in a slot to which the first time-frequency resource block belongs.

In one embodiment, the first parameter set comprises an initial value of the third timer.

In one embodiment, when the third timer is running, the first node is in a continuous reception state.

In one embodiment, when the third timer is running, the first node is in the active time.

In one embodiment, when the third timer is running, the first node monitors a physical layer signaling in all D2D resource pools.

In one embodiment, when the third timer is running, the first node monitors a physical layer signaling in all V2X resource pools.

In one embodiment, when the third timer is running, the first node monitors DCI in all downlink slots.

In one subembodiment of the above embodiment, a radio signal scheduled by each target signaling in the plurality of target signalings is correctly decoded (that is, no retransmission is needed) before the first time-frequency resource block.

In one subembodiment of the above embodiment, at least one of the plurality of target signaling is not transmitted by the second node U2.

In one embodiment, the second node U2 transmits a plurality of target signalings in the first time resource pool, and any of the plurality of target signalings comprises the second identification component; the target signaling in step S202 is one of the plurality of target signalings.

In one embodiment, the first node U1 and the second node U2 are respectively a UE.

In one embodiment, the first time resource pool comprises a first time interval and a second time interval; in the first time resource, a monitoring for the first signal is executed at least in the first time interval.

In one embodiment, in the first time resource, a monitoring for the first signal is not executed in the second time interval.

In one embodiment, in the first time resource, a monitoring for the first signal is executed in the second time interval.

In one embodiment, the first time-frequency resource block belongs to a first slot of the second time interval in time domain.

In one embodiment, the first time-frequency resource block belongs to a slot of the second time interval in time domain.

In one subembodiment of the above embodiment, the first node is in an active time in the first time interval.

In one embodiment, in a slot to which the first time-frequency resource block belongs, a drx-Retransmission-Timer of a HARQ process corresponding to the first bit block is not started.

In one embodiment, the first signaling indicates a HARQ process number corresponding to the first bit block.

In one embodiment, the first signaling is any physical layer signaling carrying Y1 bits in the first link layer ID, Y1 being a positive integer greater than 1.

In one embodiment, the first signaling is any physical layer signaling carrying Y1 bits in the first link layer ID transmitted by a second node, Y1 being a positive integer greater than 1.

In one embodiment, the second node U2 and the first node U1 establishes a Radio Resource Control (RRC) connection.

In one embodiment, an ID of the second node U2 is indicated by the first signaling.

In one embodiment, an ID of the second node U2 is used for scrambling of the first signaling.

In one embodiment, an ID of the second node U2 is used for scrambling of the first signal.

In one embodiment, an ID of the second node U2 is used to generate a CRC of the first signaling.

In one embodiment, an ID of the second node U2 is used to generate a CRC of the first signal.

In one embodiment, the first link ID is generated by ProSe function, and then is respectively transferred to the first node U1 and the second node U2.

In one embodiment, the first link ID is generated by ProSe application server, and then is respectively transferred to the first node U1 and the second node U2.

In one embodiment, the first link ID is generated by the first node U1.

In one subembodiment of the above embodiment, the first link ID is transferred by the first node U1 to the second node U2 through a ProSe function.

In one subembodiment of the above embodiment, the first link ID is transferred by a MAC layer of the first node U1 to a MAC layer of the second node U2.

In one subembodiment of the above embodiment, the first link ID is generated by a MAC layer of the first node U1.

In one subembodiment of the above embodiment, a MAC layer of the first node U1 generates the first link ID according to an application layer ID transferred by a ProSe application of the first node.

In one embodiment, a number of bits of the application layer IDs is greater than a number of bits of the first link layer ID.

Embodiment 6

Figures 6, 7, 8, 9:
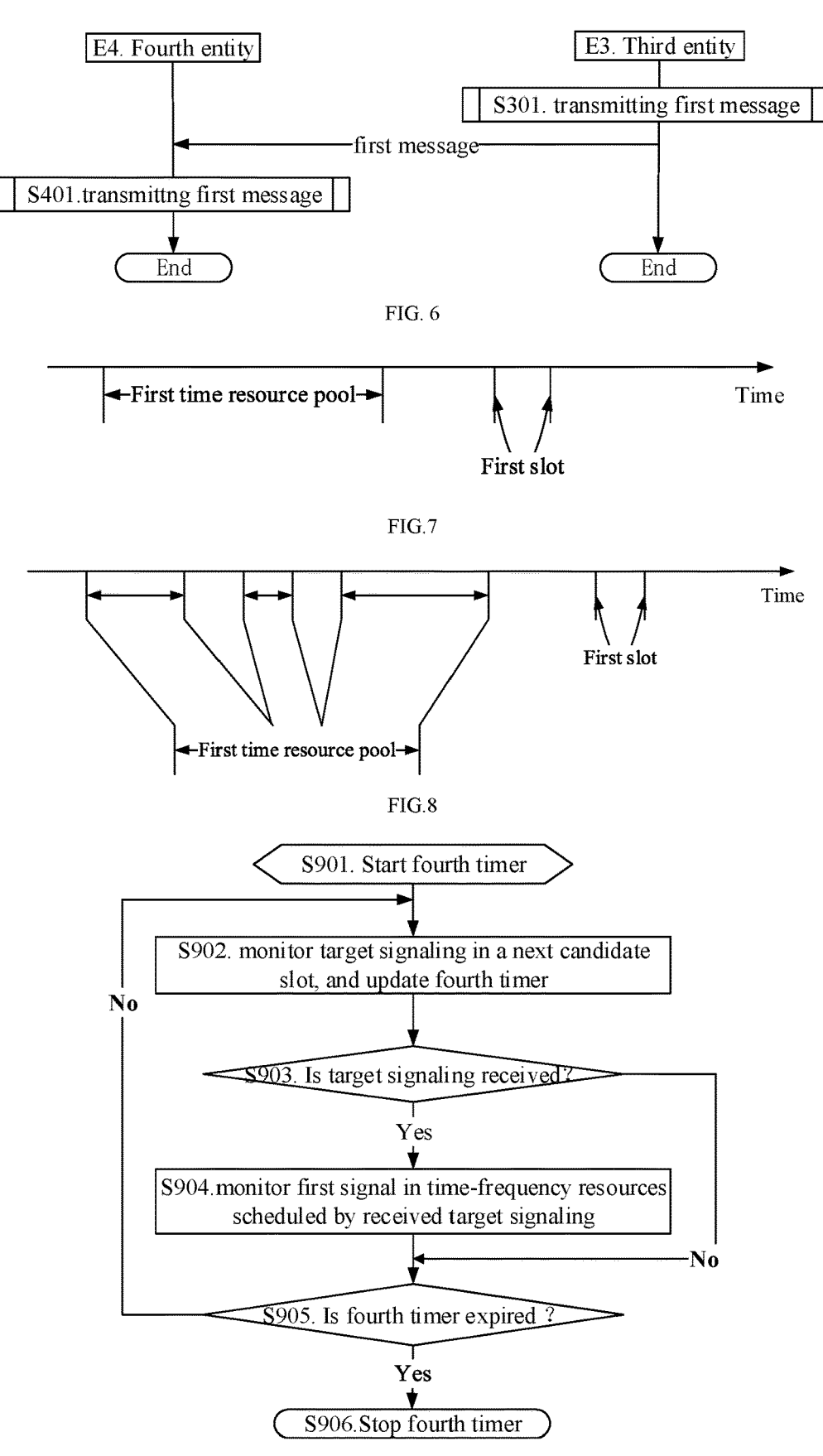
FIG. 6 illustrates a flowchart of transmission a first message according to one embodiment of the present disclosure.
FIG. 7 illustrates a schematic diagram of a first time resource pool according to one embodiment of the present disclosure.
FIG. 8 illustrates a schematic diagram of a first time resource pool according to another embodiment of the present disclosure.
FIG. 9 illustrates a flowchart of timekeeping employing a fourth timer according to one embodiment of the present disclosure.

Embodiment 6 illustrates a flowchart of transmission of a first message according to one embodiment of the present disclosure, as shown in FIG. 6.

In embodiment 6, a third entity E3 transmits a first message to a fourth entity E4.

In one embodiment, the fourth entity E4 determines a first link layer ID list according to the first message, and a first link layer ID is a link layer ID in the first link layer ID list.

In one embodiment, the first link layer ID list only comprises a link layer ID.

In one embodiment, the first link layer ID list comprises a plurality of link layer IDs.

In one embodiment, a first link layer ID is any link layer ID in the first link layer ID list, that is, a first node monitors a corresponding radio signal for all link layer IDs in the first link layer ID list.

In one embodiment, the first message indicates a first application layer ID list, and each application layer ID in the first application layer ID list is mapped to a link layer ID in the first link layer ID list.

In one embodiment, the first message indicates a first application layer ID list, and each application layer ID in the first application layer ID list is mapped to a link layer ID; if a target signaling corresponding to the link layer ID is received in the first time resource pool, the link layer ID belongs to the first link layer ID list.

In one embodiment, the third entity E3 and the fourth entity E4 belong to a first node and a second node respectively.

In one embodiment, the third entity E3 and the fourth entity E4 belong to a ProSe application of a first node and a ProSe application of a second node respectively.

In one embodiment, the third entity E3 and the fourth entity E4 belong to a ProSe function and ProSe application of a first node respectively.

In one embodiment, the third entity E3 and the fourth entity E4 belong to a ProSe function and ProSe application of the second node respectively.

In one embodiment, the third entity E3 and the fourth entity E4 belong to a ProSe application server and a ProSe application of the first node respectively.

In one embodiment, the third entity E3 and the fourth entity E4 belong to a ProSe application of a first node and a MAC layer of a first node respectively.

In one embodiment, the third entity E3 and the fourth entity E4 belong to a ProSe application of a first node and a MAC layer of a first node respectively.

Embodiment 7

Embodiment 7 illustrates a schematic diagram of a first time resource pool, as shown in FIG. 7.

In FIG. 7, a first time resource pool is consecutive in time domain.

In one embodiment, the first time resource pool comprises at least one slot.

In one embodiment, a slot comprises 14 multicarrier symbols.

In one embodiment, a slot comprises 12 multicarrier symbols.

In one embodiment, a slot comprises a SCI search space.

In one embodiment, a first time-frequency resource block belongs to a first slot in time domain; and the first slot is after than the first time resource pool.

Embodiment 8

Embodiment 8 illustrates another schematic diagram of a first time resource pool, as shown in FIG. 8.

In FIG. 7, a first time resource pool is inconsecutive in time domain.

In one embodiment, the first time resource pool comprises at least one slot.

In one embodiment, a slot in the first time resource pool is reserved for V2X.

In one embodiment, a slot in the first time resource pool is reserved for a V2X resource pool.

In one embodiment, a first time-frequency resource block belongs to a first slot in time domain; and the first slot is after than the first time resource pool.

In one embodiment, the first slot is reserved for V2X.

In one embodiment, the first time resource pool and the first slot are reserved for a same V2X resource pool.

Embodiment 9

Embodiment 9 illustrates a flowchart of timekeeping by employing a fourth timer according to one embodiment of the present disclosure, as shown in FIG. 9. Steps illustrated by FIG. 9 are implemented in a first node.

Start a fourth timer in step S901; monitor a target signaling in a next candidate slot in step S902, and update a fourth timer; judge whether a target signaling is received in step S903; if yes, monitor a first signal in time-frequency resources scheduled by a received target signaling in step S904, if no, judge whether the fourth timer is expired in step S905; if yes, stop the fourth timer in step S906; and if no, skip to the step S902.

In embodiment 9, the step S904 is at least executed once.

In one embodiment, the fourth timer is a on duration timer.

In one embodiment, the starting a fourth timer is to set a fourth timer to 0, and the updating a fourth timer is to add a value of a fourth timer by 1; if a fourth timer is equal to a first integer, the fourth timer is expired, otherwise the fourth timer is not expired.

In one embodiment, the starting a fourth timer is to set a fourth timer to a first integer, and the updating a fourth timer is to subtract a value of a fourth timer by 1; if a fourth timer is equal to 0, the fourth timer is expired, otherwise the fourth timer is not expired.

In one embodiment, the first integer is fixed.

In one embodiment, the first integer is configured by a downlink signaling.

In one embodiment, the downlink signaling is a higher layer signaling.

In one embodiment, the downlink signaling is broadcast.

In one embodiment, the next candidate slot is a nearest upcoming slot.

In one embodiment, the next candidate slot is a nearest upcoming slot reserved for V2X.

In one embodiment, the next candidate slot is a nearest upcoming slot reserved for a same V2X resource pool.

In one embodiment, the fourth timer is maintained at the MAC layer.

In one embodiment, the fourth timer is maintained by a MAC entity.

In one embodiment, when the fourth timer is running, the first node is in a continuous reception state.

In one embodiment, when the fourth timer is running, the first node is in an active time.

In one embodiment, when the fourth timer is running, the first node monitors a physical layer signaling in all D2D resource pools.

In one embodiment, when the fourth timer is running, the first node monitors a physical layer signaling in all V2X resource pools.

In one embodiment, when the fourth timer is running, the first node monitors DCI in all Downlink slots.

In one embodiment, the first parameter set comprises the first integer.

Embodiment 10

Figures 10, 11, 12:
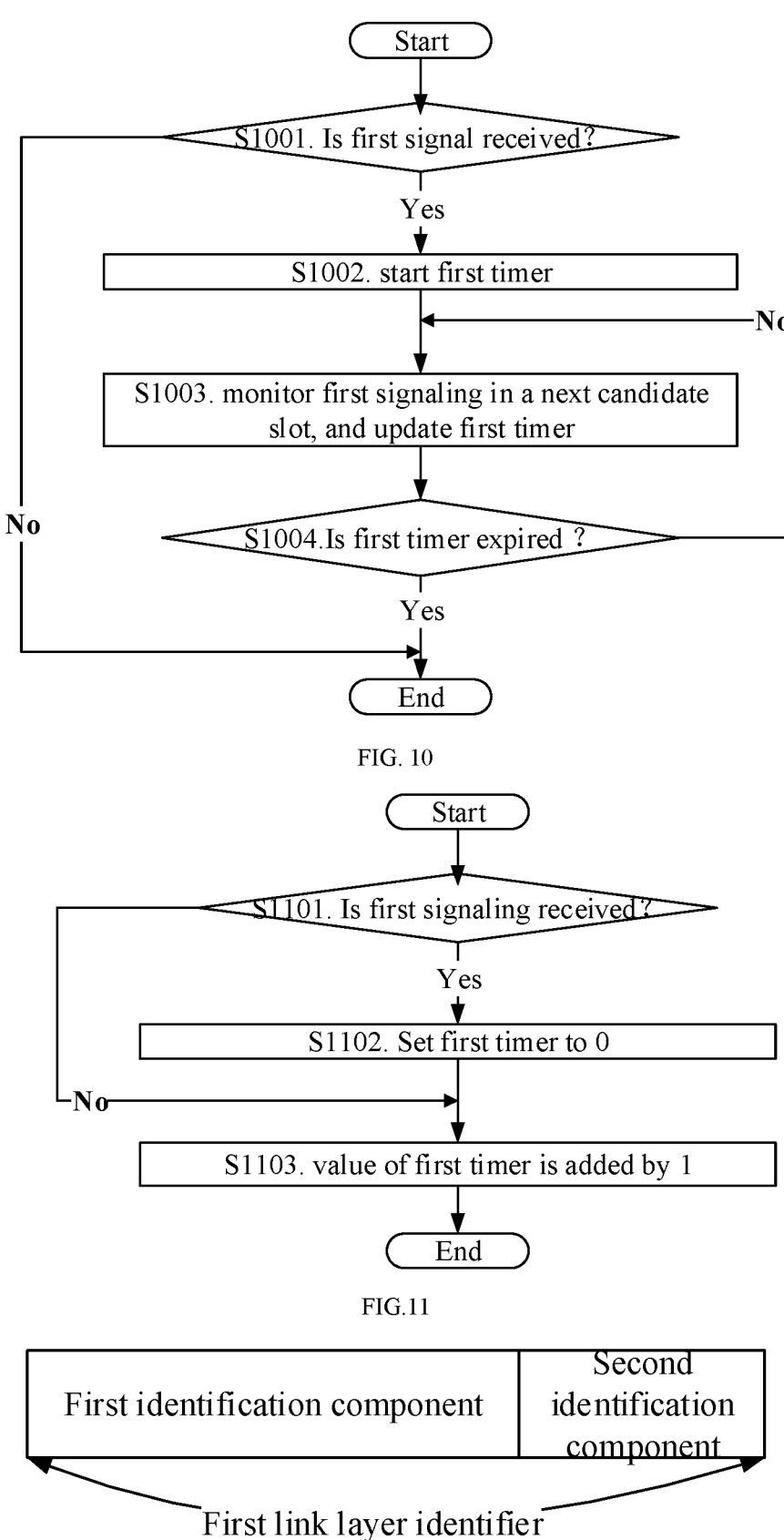
FIG. 10 illustrates a flowchart of timekeeping employing a first timer according to one embodiment of the present disclosure.
FIG. 11 illustrates a flowchart of updating a first timer according to one embodiment of the present disclosure.
FIG. 12 illustrates a schematic diagram of a first link layer ID according to one embodiment of the present disclosure.

Embodiment 10 illustrates a flowchart of timekeeping by employing a first timer according to one embodiment of the present disclosure, as shown in FIG. 10. Steps illustrated by FIG. 10 are executed in a first node.

Judge whether a first signal is received in step S1001, if yes, start a first timer in step S1002, and if no, end the step. In step S1003, monitor a first signaling in a next candidate slot, and update a first timer; judge whether a first timer is expired in step S1004, if yes, end the step, if no, jump to step S1003.

In one embodiment, the first timer is a DRX inactivity timer.

In one embodiment, the starting a first timer is to set the first timer as 0, and the updating the first timer is to add a value of the first timer by 1; if the first timer is equal to a second integer, the first timer is expired, otherwise the first timer is not expired.

In one embodiment, the starting a first timer is to set the first timer to a second integer, and the updating the first timer is to subtract a value of the first timer by 1; if the first timer is equal to 0, the first timer is expired, otherwise the first timer is not expired.

In one embodiment, the second integer is fixed.

In one embodiment, the second integer is configured by a downlink signaling.

In one embodiment, the downlink signaling is a higher layer signaling.

In one embodiment, the downlink signaling is broadcast.

In one embodiment, the next candidate slot is a nearest upcoming slot.

In one embodiment, the next candidate slot is a nearest upcoming slot reserved for V2X.

In one embodiment, the next candidate slot is a nearest upcoming slot reserved for a same V2X resource pool.

In one embodiment, a first time-frequency resource block belongs to the first time resource pool in time domain.

In one embodiment, the first timer is maintained at the MAC layer.

In one embodiment, the first timer is maintained by a MAC entity.

In one embodiment, when the first timer is running, the first node is in a continuous reception state.

In one embodiment, when the first timer is running, the first node is in an active time.

In one embodiment, when the first timer is running, the first node monitors a physical layer signaling in all D2D resource pools.

In one embodiment, when the first timer is running, the first node monitors a physical layer signaling in all V2X resource pools.

In one embodiment, when the first timer is running, the first node monitors DCI in all downlink slots.

In one embodiment, the first parameter set comprises the second integer.

In one embodiment, in the step S1001 (that is when the first signal is not successfully received in the first time resource pool), counting of a first timer is maintained (i.e., the first timer is running); in the step S1002, (i.e., when the first signal is successfully received in the first time resource pool), a first timer is restarted.

In one embodiment, in the step S1001 (i.e., when the first signal is not successfully received in the first time resource pool), a halted state of a first timer is maintained; in the step S1002, (i.e., when the first signal is successfully received in the first time resource pool), a first timer is started.

In one embodiment, when the first bit block is successfully decoded and the first link layer ID does not comprise the first identification component, a second timer is started; when the first bit block is successfully decoded and the first link layer ID comprises the first identification component, a halted state of a second timer is maintained.

In one subembodiment of the above embodiment, the first signaling is received in the first time resource pool.

In one embodiment, the second timer is a DRX short cycle timer.

In one embodiment, when the first timer is running, the first node is in a continuous reception state; and when the second timer is running, the first node is in a discontinuous reception state.

In one embodiment, when the first timer is running, the first node is in a DRX short cycle; and when the second timer is running, the first node is in a DRX long cycle.

In one embodiment, the first parameter set comprises an initial value of the second timer.

In one embodiment, an initial value of the second timer is the same as a number of slots comprised in the first time resource pool.

Embodiment 11

Embodiment 11 illustrates a flowchart of updating a first timer according to one embodiment of the present disclosure, as shown in FIG. 11. Embodiment 1003 can be regarded as a specific embodiment of step S1003 in Embodiment 10.

In step S1101, judge whether a first signaling is received, if yes, set a first timer to 0 in step S1102, if no, increase a value of the first timer by 1 in step S1103.

Embodiment 12

Embodiment 12 illustrates a schematic diagram of a first link layer ID according to one embodiment of the present disclosure, as shown in FIG. 12.

In Embodiment 12, the first link layer ID consists of a first identification component and a second identification component.

In one embodiment, the first identification component and the second identification component respectively consist of 16 bits and 8 bits.

Embodiment 13

Figure 13:
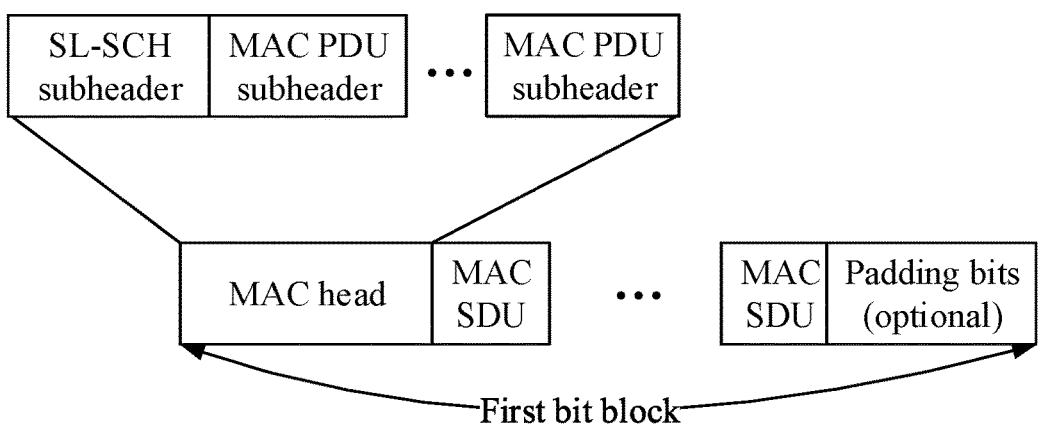
FIG. 13 illustrates a schematic diagram of a first bit block according to one embodiment of the present disclosure.

Embodiment 13 illustrates a schematic diagram of a first bit block according to one embodiment of the present disclosure, as shown in FIG. 13.

In Embodiment 13, the first bit block comprises a MAC head, and at least one MAC SDU, as well as optional padding bits; and the MAC head comprises an SL-SCH subheader and at least one MAC PDU subheader. The SL-SCH subheader comprises a first identification component.

Embodiment 14

Figure 14:
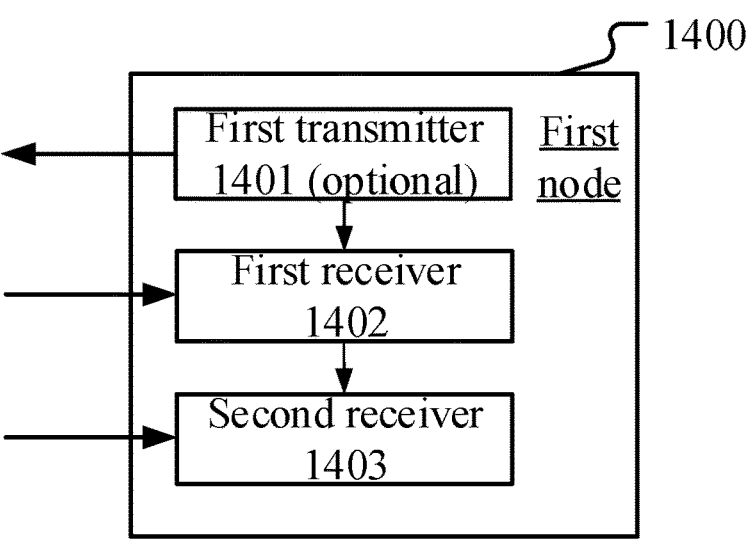
FIG. 14 illustrates a structure block diagram of a processing device in a first node according to one embodiment of the present disclosure.

Embodiment 14 illustrates a structure block diagram of a processing device in a first node according to one embodiment of the present disclosure, as shown in FIG. 14. In FIG. 14, a processing device 1400 in a first node comprises a first transmitter 1401, a first receiver 1402, and a second receiver 1403; wherein the first transmitter 1401 is optional.

The first transmitter 1401 transmits a second signaling, the second signaling indicates a first parameter set, and the first parameter set indicates the first time resource pool; the first receiver 1402 monitors a first signal in a first time resource pool, a first bit block is used to generate the first signal, the first bit block comprises a MAC PDU, and the first bit block comprises a first identification component; and when the first signal is successfully received in the first time resource pool, the second receiver 1403 monitors a first signaling on a first time-frequency resource block; when the first signal is not successfully received in the first time resource pool, the second receiver 1403 drops monitoring a first signaling on a first time-frequency resource block;

in embodiment 14, the first signaling is a physical layer signaling, and the first signaling comprises a second identification component; both the first identification component and the second identification component belong to a first link layer ID.

In one embodiment, the second receiver 1403 drops monitoring a first signaling on a first time-frequency resource block comprises: the second receiver 1403 remains a closed state in a slot to which a first time-frequency resource block belongs.

In one embodiment, the second receiver 1403 drops monitoring a first signaling on a first time-frequency resource block comprises: switching off an RF module in a slot to which a first time-frequency resource block belongs.

In one embodiment, the first receiver 1402 determines a first link layer ID list, and the first link layer ID is any link layer ID in the first link layer ID list.

In one embodiment, the second receiver 1403 receives at least one target signaling in the first time resource pool; herein, each of the at least one target signaling is a physical layer signaling, and each of the at least one target signaling comprises the second identification component; and when the first signal is monitored in the first time resource pool, the first signal is scheduled by one of the at least one target signaling.

In one embodiment, when the first signal is not successfully received in the first time resource pool, the first receiver 1402 maintains counting of a first timer; and when the first signal is successfully received in the first time resource pool, the first receiver 1402 restarts a first timer.

In one embodiment, the phrase of keeping counting of a first timer comprises: a value of the first timer is added by 1 every time a slot passes.

In one embodiment, the phrase of keeping counting of a first timer comprises: a value of the first timer is added by 1 every time a slot reserved for V2X passes.

In one embodiment, the phrase of restarting a first timer comprises: setting a value of the first timer to 0, and keeping running.

In one embodiment, when the first signal is not successfully received in the first time resource pool, the first receiver 1402 maintains a halted state of a first timer; and when the first signal is successfully received in the first time resource pool, the first receiver 1402 starts a first timer.

In one embodiment, the phrase of starting a first timer comprises: setting a value of the first timer to 0, and keeping running.

In one embodiment, when a radio signal scheduled by any of the at least one target signaling is not correctly decoded, the first receiver 1402 starts a third timer; when radio signal(s) scheduled by each of the at least one target signaling is(are) correctly decoded, the first receiver maintains a halted state of a third timer; herein, the third timer is in a halted state in a slot to which the first time-frequency resource block belongs.

In one embodiment, the first node 1200 is a UE.

In one embodiment, the first transmitter 1401 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In one embodiment, the first transmitter 1401 comprises the antenna 452, the transmitter/receiver 454, the multi-antenna transmitting processor 457, the transmitting processor 468, the controller/processor 459, the memory 460 and the data source 467 in FIG. 4 of the present disclosure.

In one embodiment, the first receiver 1402 comprises at least the first five of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1402 comprises at least the first four of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1403 comprises at least the first three of the antenna 452, the receiver 454, the multi-antenna receiving processor 458, the receiving processor 456, the controller/processor 459, the memory 460 or the data source 467 in FIG. 4 of the present disclosure.

Embodiment 15

Figure 15:
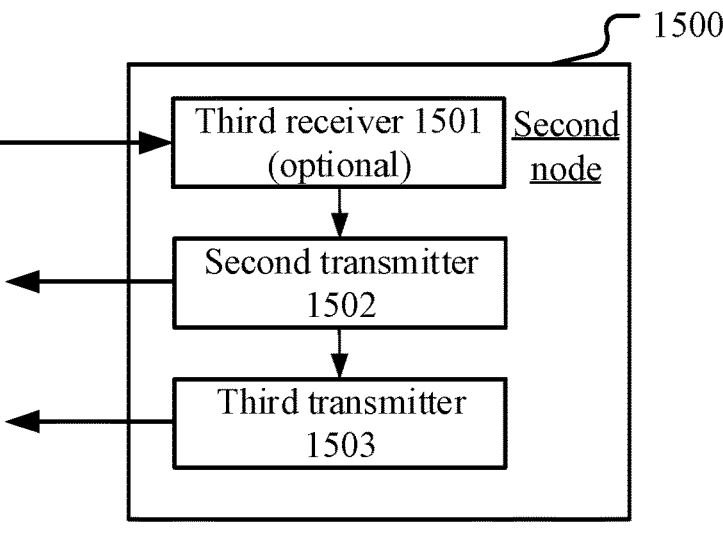
FIG. 15 illustrates a structure block diagram of a processing device in a second node according to one embodiment of the present disclosure.

Embodiment 15 illustrates a structure block diagram of a processing device in a second node according to one embodiment of the present disclosure, as shown in FIG. 15. In FIG. 15, a processing device 1500 of a second node comprises a third receiver 1501, a second transmitter 1502, and a third transmitter 1503; herein, the third receiver 1501 is optional.

The third receiver 1501 receives a second signaling; the second signaling indicating a first parameter set; and the first parameter set indicates the first time resource pool; the second transmitter 1502 transmits a first signal, a first bit block is used to generate the first signal, the first bit block comprises a MAC PDU, and the first bit block comprises a first identification component; and the third transmitter 1503 selects an appropriate time-frequency resource block out of a candidate time-frequency resource pool, and transmits a first signaling in the appropriate time-frequency resource block;

In embodiment 15, the first signaling is a physical layer signaling, and the first signaling comprises a second identification component; both the first identification component and the second identification component belong to a first link layer ID; when the first signal is transmitted in the first time resource pool, the candidate time-frequency resource pool comprises a first time-frequency resource block; and when the first signal is not transmitted in the first time resource pool, the candidate time-frequency resource pool does not comprise a first time-frequency resource block.

In one embodiment, the second transmitter 1502 determines a second link layer ID list, the first link layer ID is a link layer ID in the second link layer ID list.

In one embodiment, the third transmitter 1503 transmits at least one target signaling in the first time resource pool; herein, each of the at least one target signaling is a physical layer signaling, and each of the at least one target signaling comprises the second identification component; the first signal is scheduled by one of the at least one target signaling.

In one embodiment, when time-domain resources occupied by the first signal are not present in the first time resource pool, the third transmitter 1503 keeps counting of a first reference timer; and when time-domain resources occupied by the first signal are present in the first time resource pool, the third transmitter 1503 restarts a first reference timer.

In one embodiment, the first reference timer is an equivalent of a first timer, which can ensure that a second node and a first node have a constant understanding of a DRX state.

In one embodiment, when time-domain resources occupied by the first signal are not present in the first time resource pool, the third transmitter 1503 maintains a halted state of a first reference timer; and when time-domain resources occupied by the first signal are present in the first time resource pool, the third transmitter 1503 starts a first reference timer.

In one embodiment, when an ACK associated with any of the at least one target signaling is not received, the third transmitted 1503 starts a third reference timer; when ACK(s) associated with each of the at least one target signaling is(are) received, the third transmitter 1503 maintains a halted state of a third reference timer; herein, the third reference timer is in a halted state in a slot to which the first time-frequency resource block belongs.

In one embodiment, the second node 1500 is a UE.

In one embodiment, the second transmitter 1502 comprises the antenna 420, the transmitter 418, the transmitting processor 416 and the controller/processor 475.

In one embodiment, the second transmitter 1502 comprises the antenna 420, the transmitter 418, the multi-antenna transmitting processor 471, the transmitting processor 416 and the controller/processor 475.

In one embodiment, the second transmitter 1503 comprises the antenna 420, the transmitter 418, the transmitting processor 416 and the controller/processor 475.

In one embodiment, the second transmitter 1503 comprises the antenna 420, the transmitter 418, the multi-antenna transmitting processor 471, the transmitting processor 416 and the controller/processor 475.

In one embodiment, the third receiver 1501 comprises the antenna 420, the receiver 418, the multi-antenna receiving processor 472, the receiving processor 470 and the controller/processor 475.

In one embodiment, the third receiver 1501 comprises the controller/processor 475.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, monitoring a first signal in a first time resource pool, a first bit block being used to generate the first signal, the first bit block comprising a MAC Protocol Data Unit (PDU), and the first bit block comprising a first identification component; and
   a second receiver, when the first signal is successfully received in the first time resource pool, monitoring a first signaling on a first time-frequency resource block; and when the first signal is not successfully received in the first time resource pool, dropping monitoring a first signaling on a first time-frequency resource block;
   the second receiver, receiving at least one target signaling in the first time resource pool, wherein each of the at least one target signaling is a physical layer signaling, and each of the at least one target signaling comprises a second identification component; when the first signal is monitored in the first time resource pool, the first signal is scheduled by one of the at least one target signaling;
   wherein the first signaling is a physical layer signaling, and the first signaling comprises the second identification component; both the first identification component and the second identification component belong to a first link layer identifier (ID).

2. The first node according to claim 1, comprising:
   the first receiver, determining a first link layer ID list, the first link layer ID being any link layer ID in the first link layer ID list.

3. The first node according to claim 1, comprising:

a first transmitter, transmitting a second signaling; the second signaling indicating a first parameter set;

and the first parameter set indicating the first time resource pool.

4. The first node according to claim 1, comprising:

when the first signal is not successfully received in the first time resource pool, the first receiver keeping counting of a first timer; and when the first signal is successfully received in the first time resource pool, the first receiver restarting a first timer.

5. The first node according to claim 1, comprising:

when the first signal is not successfully received in the first time resource pool, the first receiver maintaining a halted state of a first timer; and when the first signal is successfully received in the first time resource pool, the first receiver starting the first timer.

6. The first node according to claim 1, comprising:

when a radio signal scheduled by any of the at least one target signaling is not correctly decoded, the first receiver starts a third timer; and when radio signal(s) scheduled by each of the at least one target signaling is (are) correctly decoded, the first receiver maintains a halted state of the third timer;

wherein the third timer is in a halted state in a slot to which the first time-frequency resource block belongs.

7. A second node for wireless communications, comprising:

a second transmitter, transmitting a first signal, a first bit block being used to generate the first signal, the first bit block comprising a MAC PDU, and the first bit block comprising a first identification component; and a third transmitter, selecting an appropriate time-frequency resource block out of a candidate time-frequency resource pool, and transmitting a first signaling in the appropriate time-frequency resource block;

the third transmitter, transmitting at least one target signaling in the first time resource pool, wherein each of the at least one target signaling is a physical layer signaling, and each of the at least one target signaling comprises a second identification component; the first signal is scheduled by one of the at least one target signaling;

wherein the first signaling is a physical layer signaling, and the first signaling comprises the second identification component; both the first identification component and the second identification component belong to a first link layer ID; when the first signal is transmitted in the first time resource pool, the candidate time-frequency resource pool comprises a first time-frequency resource block; and when the first signal is not transmitted in the first time resource pool, the candidate time-frequency resource pool does not comprise a first time-frequency resource block.

8. The second node according to claim 7, comprising:

the second transmitter, determining a second link layer ID list, and the first link layer ID is a link layer ID in the second link layer ID list.

9. The second node according to claim 7, comprising:

a third receiver, receiving a second signaling; the second signaling indicating a first parameter set; and the first parameter set indicating the first time resource pool.

10. The second node according to claim 7, comprising:

when the first signal is not successfully received in the first time resource pool, and when time-domain resources occupied by the first signal are not present in the first time resource pool, the third transmitter maintains counting of a first reference timer; when time-domain resources occupied by the first signal are present in the first time resource pool, the third transmitter restarting a first reference timer.

11. The second node according to claim 7, comprising:

when time-domain resources occupied by the first signal are not present in the first time resource pool, the third transmitter maintaining a halted state of a first reference timer; and when time-domain resources occupied by the first signal are present in the first time resource pool, the third transmitter starting the first reference timer.

12. The second node according to claim 7, comprising:

when an ACK associated with any of the at least one target signaling is not received, starting a third reference timer; and when ACK(s) associated with each of the at least one target signaling is (are) received, maintaining a halted state of the third reference timer;

wherein the third reference timer is in a halted state in a slot to which the first time-frequency resource block belongs.

13. A method in a first node for wireless communications, comprising:

monitoring a first signal in a first time resource pool, a first bit block being used to generate the first signal, the first bit block comprising a MAC PDU, and the first bit block comprising a first identification component;

when the first signal is successfully received in the first time resource pool, monitoring a first signaling on a first time-frequency resource block; and when the first signal is not successfully received in the first time resource pool, dropping monitoring a first signaling on a first time-frequency resource block; and receiving at least one target signaling in the first time resource pool, wherein each of the at least one target signaling is a physical layer signaling, and each of the at least one target signaling comprises a second identification component; and when the first signal is monitored in the first time resource pool, the first signal is scheduled by one of the at least one target signaling wherein the first signaling is a physical layer signaling, and the first signaling comprises the second identification component; both the first identification component and the second identification component belong to a first link layer ID.

14. The method in a first node for wireless communications according to claim 13, comprising:

determining a first link layer ID list, the first link layer ID being any link layer ID in the first link layer ID list.

15. A method in a second node for wireless communications, comprising:

transmitting a first signal, a first bit block being used to generate the first signal, the first bit block comprising a MAC PDU, and the first bit block comprising a first identification component;

selecting an appropriate time-frequency resource block out of a candidate time-frequency resource pool, and transmitting a first signaling in the appropriate time-frequency resource block; and transmitting at least one target signaling in the first time resource pool, wherein each of the at least one target signaling is a physical layer signaling, and each of the at least one target signaling comprises a second identification component; the first signal is scheduled by one of the at least one target signaling wherein the first signaling is a physical layer signaling, and the first signaling comprises the second identification component; both the first identification component and the second identification component belong to a first link layer ID; when the first signal is transmitted in the first time resource pool, the candidate time-frequency resource pool comprises a first time-frequency resource block; and when the first signal is not transmitted in the first time resource pool, the candidate time-frequency resource pool does not comprise a first time-frequency resource block.

16. The method in a second node for wireless communications according to claim 15, comprising:

determining a second link layer ID list, the first link layer ID is a link layer ID in the second link layer ID list.

* * * * *